United States Patent [19]

Epperly et al.

[11] Patent Number: 4,844,878
[45] Date of Patent: Jul. 4, 1989

[54] PROCESS FOR THE REDUCTION OF NITROGEN OXIDES IN AN EFFLUENT

[75] Inventors: William R. Epperly, New Canaan; James C. Sullivan, Southport; Barry N. Sprague, West Haven, all of Conn.

[73] Assignee: Fuel Tech, Inc., Stamford, Conn.

[21] Appl. No.: 108,779

[22] Filed: Oct. 14, 1987

Related U.S. Application Data

[63] Continuation-in-part of Ser. No. 784,828, Oct. 4, 1985, Ser. No. 14,431, Feb. 13, 1987, Ser. No. 22,799, Mar. 6, 1987, Ser. No. 25,350, Mar. 13, 1987, Ser. No. 25,493, Mar. 13, 1987, Ser. No. 39,013, Apr. 15, 1987, and Ser. No. 100,128, Sep. 23, 1987.

[51] Int. Cl.$^4$ ............................................. C01B 21/00
[52] U.S. Cl. ......................................................... 423/235
[58] Field of Search ............................ 423/235, 235 D

[56] References Cited

U.S. PATENT DOCUMENTS

| 3,801,696 | 4/1974 | Mark | 423/235 |
|---|---|---|---|
| 3,846,981 | 11/1974 | Paczkowski | 60/274 |
| 3,900,554 | 8/1975 | Lyon | 423/235 |
| 4,087,372 | 5/1978 | Saitoh et al. | 423/235 |
| 4,115,515 | 9/1978 | Tenner et al. | 423/235 |
| 4,208,386 | 6/1980 | Arand et al. | 423/235 |
| 4,325,924 | 4/1982 | Arand et al. | 423/235 |
| 4,350,669 | 9/1982 | Izumi et al. | 423/235 |
| 4,419,333 | 12/1983 | Reus et al. | 423/235 |
| 4,507,269 | 3/1985 | Dean et al. | 423/235 |
| 4,624,840 | 11/1986 | Dean et al. | 423/235 |

FOREIGN PATENT DOCUMENTS

| 2630202 | 2/1977 | Fed. Rep. of Germany . | |
| 3008012 | 9/1981 | Fed. Rep. of Germany | 423/235 |
| 51-76166 | 7/1976 | Japan . | |
| 51-104948 | 9/1976 | Japan . | |
| 5333975 | 9/1976 | Japan . | |
| 50-67669 | 12/1976 | Japan . | |
| 5379762 | 12/1976 | Japan . | |
| 53-12802 | 3/1977 | Japan . | |
| 53-13027 | 4/1977 | Japan . | |
| 51-1138 | 7/1977 | Japan . | |
| 51-4588 | 7/1977 | Japan . | |
| 52-85056 | 7/1977 | Japan . | |
| 51-12330 | 8/1977 | Japan . | |
| 5189176 | 2/1978 | Japan . | |
| 54-12357 | 3/1978 | Japan . | |
| 30975 | 3/1978 | Japan | 423/235 |
| 53-130274 | 11/1978 | Japan . | |
| 54-123573 | 9/1979 | Japan . | |
| 87-02023 | 10/1986 | World Int. Prop. O. | 423/235 |

Primary Examiner—Gregory A. Heller
Attorney, Agent, or Firm—St. Onge Steward Johnston and Reens

[57] ABSTRACT

A process is presented for the reduction of nitrogen oxides in the effluent from the combustion of a carbonaceous fuel. The process comprises introducing a treatment agent comprising a composition selected from the group consisting of $NH_4$-lignosulfonate, calcium lignosulfonate, 2-furoci acid, 1,3 dioxolane, 1,4 dioxane, tetrahydrofuran, furfurylamine, furfurylalcohol, gluconic acid, citric acid, formic acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galactose into an effluent under conditions effective to reduce the concentration of nitrogen oxides in the effluent.

24 Claims, No Drawings

PROCESS FOR THE REDUCTION OF NITROGEN OXIDES IN AN EFFLUENT

DESCRIPTION

RELATED APPLICATIONS

This application is a continuation-in-part of copending and commonly assigned U.S. patent application entitled "Reduction of Nitrogen-Based Pollutants Through the Use of Urea Solutions Containing Oxygenated Hydrocarbon Solvents" having Ser. No. 784,828, filed Oct. 4, 1985 in the name of Bowers; copending and commonly assigned U.S. patent application entitled "Process for the Reduction of Nitrogen Oxides in an Effluent" having Ser. No. 014,431, filed Feb. 13, 1987 in the names of Epperly and Sullivan; copending and commonly assigned U.S. patent application entitled "Process for Reducing Nitrogen Oxides in an Effluent Using a Hydrocarbon or Hydrogen Peroxide" having Ser. No. 022,799, filed Mar. 6, 1987 in the name of Sullivan; copending and commonly assigned U.S. patent application entitled "Process for the Reduction of Nitrogen Oxides in an Effluent Using Sugar" having Ser. No. 025,350, filed Mar. 13, 1987 in the names of Epperly and Sullivan; copending and commonly assigned U.S. patent application entitled "Process for the Reduction of Nitrogen Oxides in an Effluent Using a Heterocyclic Hydrocarbon" having Ser. No. 025,493, filed Mar. 13, 1987 in the names of Epperly and Sullivan; copending and commonly assigned U.S. patent application entitled "Process for the Reduction of Nitrogen Oxides in an Effluent Using a Hydroxy Amino Hydrocarbon" having Ser. No. 039,013, filed Apr. 15, 1987 in the names of Sullivan and Epperly; and copending and commonly assigned U.S. patent application entitled "Process for the Reduction of Nitrogen Oxides in an Effluent" having Ser. No. 100,128, filed Sept. 23, 1987 in the names of Epperly, Sullivan and Sprague. The disclosures of each of these patent applications is hereby incorporated by reference herein in their entireties.

TECHNICAL FIELD

The present invention relates to a process for the reduction of nitrogen oxides ($NO_x$) in the effluent, especially the oxygen-rich effluent, from the combustion of a carbonaceous fuel by introduction of a treatment agent comprising a composition selected from the group consisting of $NH_4$-lignosulfonate, calcium lignosulfonate, 2-furoic acid, 1,3 dioxolane, 1,4 dioxane, tetrahydrofuran, furfurylamine, furfurylalcohol, gluconic acid, citric acid, formic acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, baributrie acid, acetie anhydride, oxalic acid, mucic acid and d-galactose into the effluent.

Carbonaceous fuels can be made to burn more completely, and with reduced emissions of carbon monoxide and unburned hydrocarbons, when the oxygen concentrations and air/fuel ratios employed are those which permit high flame temperatures When fossil fuels are used to fire large utility boilers, temperatures above about 2000° F., and typically about 2200° F. to about 3000° F., are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F.

Nitrogen oxides, especially $NO_2$, are troublesome pollutants which are found in the combustion effluent streams of boilers when fired as described above, and comprise a major irritant in smog. It is further believed that nitrogen oxides can undergo a process known as photo-chemical smog formation, through a series of reactions in the presence of sunlight and hydrocarbons. Moreover, nitrogen oxides comprise a major portion of acid rain.

Unfortunately, the temperatures within a utility or circulating fluidized bed boiler render most common methods of reducing $NO_x$ concentrations, such as effluent scrubbing or catalyst grids, either uneconomical, infeasible, or both.

BACKGROUND ART

Various methods and compositions for reducing the $NO_x$ concentration in the effluent from the combustion of a carbonaceous fuel have been proposed. For instance, Arand et al, in U.S. Pat. No. 4,208,386, disclose a method for reducing $NO_x$ in combustion effluents by injecting urea, either as a solid powder or in solution, at effluent temperatures in excess of 1300° F. The preferred urea solutions are those having at least 10 weight percent urea. For operation at temperatures below 1600° F., the use of reducing materials such as paraffinic, olefinic, aromatic and oxygenated hydrocarbons, as well as hydrogen, are required.

Similarly, Lyon, in U.S. Pat. No. 3,900,554, discloses the introduction of ammonia, as a pure substance or in the form of ammonium formate, ammonium oxalate or ammonium carbonate, into effluents at temperatures between 1300° F. and 2000° F. For operation at temperatures below 1600° F., the use of reducing materials, as is the case with Arand et al., such as paraffinic, olefinic, aromatic and oxygenated hydrocarbons, as well as carbon monoxide and hydrogen, are required.

Although the prior art processes for reducing nitrogen oxides concentrations are generally effective, there exists a present need for a process which elicits still further $NO_x$ reductions in an economical and convenient manner.

DISCLOSURE OF INVENTION

The present invention relates to a process for reducing nitrogen oxides in the effluent from the combustion of a carbonaceous fuel. More particularly, the present invention relates to a process which comprises injecting into the effluent from the combustion of a carbonaceous fuel a treatment agent comprising a composition selected from the group consisting of $NH_4$-lignosulfonate, calcium lignosulfonate, 2-furoic acid, 1,3-dioxolane, 1,4 dioxane, tetrahydrofuran, furfuryl amine, furfuryl alcohol, gluconic acid, citric acid, formic acid, n-butyl acetate, 1,3-butylene glycol, methylal, tetrahydrofurfuryl alcohol, furan, fish oil, coumalic acid, furfuryl acetate, tetrahydrofuran 2,3,4,5-tetracarboxylic acid, tetrahydrofurfurylamine, furylacrylic acid, tetrahydropyran, 2,5-furandimethanol, mannitol, hexamethylenediamine, barbituric acid, acetic anhydride, oxalic acid, mucic acid and d-galactose under conditions effective to reduce the nitrogen oxides concentration in the effluent.

BEST MODE FOR CARRYING OUT THE INVENTION

For the purposes of this description, all temperatures herein are measured using an unshielded K-type thermocouple. Unless otherwise indicated, all parts and percentages are based on the weight of the composition at the particular point of reference.

The terms "NH4-lignosulfonate" and "calcium lignosulfonate" as used herein refer respectively to the ammonium and calcium salts of lignosulfonic acid, which are sulfonate salts made from the lignin of sulfite pulp-mill liquors.

The term "1,3 dioxolane" as used herein refers to a five-membered heterocyclic hydrocarbon having oxygen at the 1 and 3 positions (also ethylene methylene dioxide).

The term "fish oil" as used herein refers to a drying oil obtained chiefly from menhaden, pilchard, sardine and herring, extracted from the entire body of the fish by cooking and compressing.

It will be understood that the compositions disclosed as being useful in the treatment agent of this invention can be substituted or unsubstituted. When substituted, typical substituents include hydrogen, alkyl, alkenyl, carboxyl, acyl, carbocyclic, aryl, amino, carbonyl, hydroxyl, alkoxyalkyl, hydroxyalkyl, thiohydroxyalkyl, alkoxy, and combinations thereof. Additionally, any two adjacent substituent groups can be linked, directly or indirectly, to form another ring.

Preferred substituents for each of the compositions of the present invention include hydrogen, straight and branched-chain, substituted and unsubstituted aliphatic groups, oxygenated hydrocarbon groups, hydroxyl groups and amino groups. Moreover, it is understood that the claimed compositions include polymerization and condensation products thereof.

As used herein, the term "alkyl" refers to a straight or branched chain hydrocarbon containing no unsaturation, e.g., methyl, ethyl, isopropyl, 2-butyl, neopentyl, n-hexyl, etc.; the term "alkoxy" refers to a univalent radical composed of an alkyl group linked through an oxygen atom having its free valence bond therefrom, e.g., methoxy (—O—CH3), ethoxy (—O—CH2—CH3), etc.; the term "acyl" refers to a carboxyl group in which the hydroxyl group has been replaced with another radical, such as alkyl, aryl, etc., e.g., acetyl

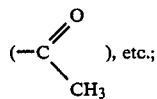

the term "carbocyclic" refers to an organic radical whose 'skeleton' is in the form of a closed ring of carbon atoms; the term "aryl" refers to an aromatic hydrocarbon group, e.g., phenyl, benzyl, naphthyl, etc.; the term "carboxyl" refers to a univalent radical composed of a carbonyl group and a hydroxyl group linked through a carbon atom having its free valence bond therefrom, e.g.,

the term "carbonyl" refers to a bivalent radical having the formula

the term "hydroxyl" refers to the univalent group —O which is characteristic of alcohols; the term "hydroxyalkyl" refers to an alkyl group having at least one hydrogen substituted with an hydroxyl group; the term "alkoxyalkyl" refers to an alkyl group having at least one hydrogen substituted with an alkoxy group; the term "thiohydroxyalkyl" refers to a hydroxyalkyl group wherein the oxygen of the hydroxyl group is replaced with sulfur; and the term "alkenyl" refers to an unsaturated radical of lower branched or unbranched alkyl groups it is derived from, having at least one double bond therein.

Advantageously, the treatment agent of this invention is introduced into the effluent in solution or as a dispersion or mixture in a suitable solvent. Water is a preferred solvent due to the economy of aqueous solutions, dispersions and mixtures and the fact that they can be employed with suitable effectiveness in most situations. For ease of description, the term "mixture" will be used to denote mixtures, dispersions and solutions. The effective mixture comprising the treatment agent of this invention will range from saturated to dilute. While water is an effective solvent for most applications, it will be recognized that there may be instances where other solvents may be advantageously used, either alone or in combination with water, as would be known to the skilled artisan.

The level of the composition selected from the group consisting of NH4-lignosulfonate, calcium lignosulfonate, 2-furoic acid, 1,3 dioxolane, 1,4 dioxane, tetrahydrofuran, furfurylamine, furfurylalcohol, gluconic acid, citric acid, formic acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galactose present in the mixture is preferably in the range of about 0.5% to about 50% by weight, most preferably about 5% to about 25% by weight.

The treatment agent of this invention is preferably introduced into the effluent in an amount effective to elicit a reduction in the nitrogen oxides concentration in the effluent. Advantageously, the treatment agent of this invention is introduced into the effluent in an amount sufficient to provide a weight ratio of the treatment agent to the baseline nitrogen oxides level of about 1:10 to about 10:1. More preferably, the treatment agent is introduced into the effluent to provide a molar ratio of treatment agent to baseline nitrogen oxides level of about 1:6 to about 5:1, most preferably about 1:5 to about 3:1.

Conditions under which nitrogen oxides can be reduced by use of a treatment agent which comprises a composition selected from the group consisting of NH4-lignosulfonate, calcium lignosulfonate, 2-furoic acid, 1,3 dioxolane, 1,4 dioxane, tetrahydrofuran, furfurylamine, furfurylalcohol, gluconic acid, citric acid, formic acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galactose include the effluent temperature at the point of introduction of the treatment agent, which is preferably less than about 1450° F., most preferably less than about 1300° F., although in many cases $NO_x$ reduction can be achieved at higher temperatures. It is surprising in view of the state of the art that these materials have independent nitrogen oxides reduction properties and that they may themselves be used as primary $NO_x$ reducing agents, especially at such low temperatures.

It is an advantageous aspect of this invention that the concentration of nitrogen oxides in an effluent from the combustion of a carbonaceous fuel can be reduced significantly at such temperatures, which are below the effective operating temperatures of most prior art $NO_x$ reducing compositions and/or processes, such as those which utilize urea or ammonia. There is no known lower limit of temperatures at which the present invention is effective at nitrogen oxides reduction, and significant reductions have been observed at temperatures as low as 800° F.

The compositions of this invention may, in addition to their use as a primary $NO_x$ reducing agent themselves, also be used to enhance the nitrogen oxides reduction achieved by known $NO_x$ reducing compositions, referred to herein as principal nitrogen oxides reducing compositions. Exemplary of such principal nitrogen oxides reducing compositions are urea or ammonia. The terms "urea" and "ammonia" as used in this description includes the compositions themselves, as well as compositions equivalent in effect. Thus, unless otherwise specified, reference in this disclosure to urea or ammonia should not be taken as limiting to urea or ammonia themselves, but should extend to urea or ammonia and all of their equivalents. It is pointed out that the term equivalent is not limited to exact equivalents, and various equivalents will be optimally operable at some conditions which are different than those for other equivalents. Moreover, some equivalents may be more effective than others. The term "ammonia" is specifically intended for the purposes of this disclosure to include ammonia precursors, that is, compositions which produce ammonia upon vaporization, such as ammonium salts of organic acids like ammonium formate, ammonium oxalate, ammonium carbonate and ammonium binoxalate.

Other principal nitrogen oxides reducing compositions include hydroxy amino hydrocarbons, disclosed by Sullivan and Epperly in U.S. patent application entitled "Process for the Reduction of Nitrogen Oxides in an Effluent Using a Hydroxy Amino Hydrocarbon", Ser. No. 039,013, filed Apr. 15, 1987; ammonium salts of organic acids having a carbon to nitrogen ratio of greater than 1:1, disclosed by Epperly, Sullivan and Sprague in U.S. patent application entitled "Process for the Reduction of Nitrogen Oxides in an Effluent", Ser. No. 090,962, filed Aug. 28, 1987; and five or six membered heterocyclic hydrocarbons having at least one cyclic nitrogen, disclosed by Epperly, Sullivan and Sprague in U.S. patent application entitled "Process for the Reduction of Nitrogen Oxides in an Effluent", Ser. No. 100,128, filed Sept. 23, 1987, the disclosures of each of which are incorporated herein by reference.

When the principal $NO_x$ reducing composition included in the treatment agent of this invention is ammonia, the enhancer used is most preferably selected from the group consisting of $NH_4$-lignosulfonate, calcium lignosulfonate, 2-furoic acid, 1,3-dioxolane, 1,4 dioxane, tetrahydrofuran, furfuryl amine, furfuryl alcohol, gluconic acid, citric acid, n-butyl acetate, 1,3-butylene glycol, methylal, tetrahydrofurfuryl alcohol, furan, fish oil, coumalic acid, furfuryl acetate, tetrahydrofuran 2,3,4,5-tetracarboxylic acid, tetrahydrofurfurylamine, furylacrylic acid, tetrahydropyran, 2,5-furandimethanol, mannitol, hexamethylenediamine, barbituric acid, acetic anhydride, mucic acid and d-galactose.

When the principal $NO_x$ reducing composition included in the treatment agent of the present invention comprises urea or any of the other principal nitrogen oxides reducing compositions disclosed above, the enhancer used can be any selected from the group consisting of $NH_4$-lignosulfonate, calcium lignosulfonate, 2-furoic acid, 1,3-dioxolane, 1,4 dioxane, tetrahydrofuran, furfuryl amine, furfuryl alcohol, gluconic acid, citric acid, formic acid, n-butyl acetate, 1,3-butylene glycol, methylal, tetrahydrofurfuryl alcohol, furan, fish oil, coumalic acid, furfuryl acetate, tetrahydrofuran 2,3,4,5-tetracarboxylic acid, tetrahydrofurfurylamine, furylacrylic acid, tetrahydropyran, 2,5-furandimethanol, mannitol, hexamethylenediamine, barbituric acid, acetic anhydride, oxalic acid, mucic acid and d-galactose.

Where urea, ammonia or any of the other disclosed principal nitrogen oxides reducing compositions is employed in the treatment agent, it should preferably be present in the mixture in the range of about 2% to about 60%, most preferably about 5% to about 30% by weight. The weight ratio of the composition selected from the group consisting of $NH_4$-lignosulfonate, calcium lignosulfonate, 2-furoic acid, 1,3 dioxolane, 1,4 dioxane, tetrahydrofuran, furfurylamine, furfurylalcohol, gluconic acid, citric acid, formic acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galactose to such principal nitrogen oxides reducing composition should advantageously be about 1:10 to about 4:1, more preferably about 1:5 to about 3:1. The most preferred weight ratio in the mixture is about 1:4 to about 2.5:1.

The treatment agent, when further comprising urea, ammonia or other principal nitrogen oxides reducing composition, whether in a mixture or introduced in pure form, is advantageously introduced into the effluent gas stream at a point where the effluent is at a temperature above about 1200° F. Preferably, the treatment agent is introduced at a point where the effluent temperature is above about 1300° F., more preferably above about 1400° F. and most preferably above about 1450° F.

The temperature of the effluent at the point of introduction will have an influence on the concentration of the mixture. At temperatures up to about 1700° F., the mixture will tend to operate effectively at high concentration, e.g., about 10% to about 65% by weight treatment agent. On the other hand, at temperatures in excess of about 1700° F., the mixture will tend more towards dilute. At these higher temperatures, water (or the solvent in case of non-aqueous solutions) may comprise greater than 80%, 85% or even 95% by weight of the mixture.

Large industrial and circulating fluidized bed boilers of the types employed for utility power plants and other large facilities will typically have access only at limited points. In the most typical situations, the boiler interior in the area above the flame operates at temperatures which at full load approach 1900° F., even 2100° F. and sometimes higher still. After subsequent heat exchange, the temperature will be lower, usually in the range between about 1000° F. and about 1900° F. At these temperatures, the treatment agent of this invention can be effectively introduced to accomplish substantial reduction of nitrogen oxides in the effluent.

The treatment agent utilized according to this invention is preferably introduced by injecting it at a number of spaced positions from nozzles or other apparatus which are effective to uniformly distribute the treatment agent through the combustion effluent.

The effluent into which the treatment agent of this invention is introduced is preferably oxygen-rich, meaning that there is an excess of oxygen in the effluent. Advantageously, the excess of oxygen is greater than about 1% by volume. More preferably, the excess of oxygen is in the range of about 1% to about 12% or greater by volume, most preferably about 1% to about 6% by volume.

It will be understood that the $NO_x$ reducing treatment agents of this invention are useful not only where substantial nitrogen oxides reductions are accomplished by directly applying the disclosed method as the principal $NO_x$ reducing method, but can also be employed as a discrete step in combination with other chemical, catalytic or other procedures for reducing nitrogen oxides concentrations as well as other pollutants such as sulfur dioxide ($SO_2$), while preferably controlling levels of residual pollutants such as ammonia and/or carbon monoxide. Such a suitable "multi-step" process is disclosed in copending and commonly assigned U.S. patent application entitled "Multi-Stage Process for Reducing the Concentration of Pollutants in an Effluent" filed in the names of Epperly, Peter-Hoblyn, Shulof and Sullivan on Mar. 6, 1987 and assigned Ser. No. 022,716, the disclosure of which is incorporated herein by reference.

A further advantageous aspect of the practice of this invention is in the reduced production of other pollutants, such as ammonia and carbon monoxide, during the nitrogen oxides reduction process. The presence of ammonia in the effluent should be avoided because, among other reasons, it can react with $SO_3$ to form ammonium bisulfate which can foul heat exchange surfaces in a boiler. Moreover, ammonia has detrimental effects on ambient air quality, as has carbon monoxide. Such lower levels of the production of other pollutants such as ammonia and carbon monoxide can most effectively be achieved by introducing the treatment agents of this invention on the right side of their nitrogen oxides reduction versus effluent temperature curve, especially on the right side of the curve plateau. This process is fully explained and taught in copending and commonly assigned U.S. patent application Ser. No. 050,198, entitled "Process for Nitrogen Oxides Reduction and Minimization of the Production of Other Pollutants", filed May 14, 1987 in the names of Epperly, O'Leary and Sullivan, the disclosure of which is incorporated herein by reference.

The following examples further illustrate and explain the invention by detailing the operation of a treatment agent comprising a five or six-membered heterocyclic hydrocarbon having at least one cyclic nitrogen in the reduction of nitrogen oxides emissions.

EXAMPLE I

The burner used is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are introduced is measured at the point of injection utilizing a K-type thermocouple. Atomizing injectors described in copending and commonly assigned U.S. patent application entitled "Process and Apparatus for Reducing the Concentration of Pollutants in an Effluent" having Ser. No. 009,696, filed in the name of Burton on Feb. 2, 1987, the disclosure of which is incorporated herein by reference, are positioned through ports in the effluent flue conduit in order to introduce and distribute the treatment agents into the effluent stream. The agents are introduced into the effluent at a rate of 300 ml/hr. The burner fuel is a Number 2 fuel oil, and the burner is fired at a rate of 8.4 lbs/hr to 10.2 lbs/hr. to achieve the desired temperature.

A baseline nitrogen oxides concentration reading is taken prior to beginning each run to calculate the introduction ratio of treatment agent to baseline nitrogen oxides, and a final nitrogen oxides reading is taken during and downstream from introduction of the treatment agents to calculate the reduction in the nitrogen oxides concentration in the effluent elicited by each of the treatment agents introduced. Additionally, ammonia and carbon monoxide readings are taken during and downstream from introduction of the treatment agents to measure the production of other pollutants.

The percent excess oxygen for each treatment agent introduction, the baseline $NO_x$, final $NO_x$, % reduction of $NO_x$, ammonia level and carbon monoxide level for each run is set out in Table 1.

The following runs are made:

(1) the treatment agent introduced is an aqueous solution which comprises 15% by weight of $NH_4$-lignosulfonate and 0.1% by weight of a commercially available surfactant and the introduction temperature is 1345° F. (run 1a) and 1185° F. (run 1b);

(2) the treatment agent introduced is an aqueous solution which comprises 15% by weight of calcium lignosulfonate and 0.1% of a commercially available surfactant and the introduction temperature is 1345° F. (run 2a) and 1200° F. (run 2b);

(3) the treatment agent introduced is an aqueous solution which comprises 10% by weight of 1,3-dioxolane and 0.1% of a commercially available surfactant and the introduction temperature is 1210° F.;

(4) the treatment agent introduced is an aqueous solution which comprises 10% by weight of 1,4 dioxane and 0.1% by weight of a commercially available surfactant and the introduction temperature is 1230° F. (run 4a) and 1215° F. (run 4b);

(5) the treatment agent introduced is an aqueous solution which comprises 10% by weight of tetrahydrofuran and 0.1% by weight of a commercially available surfactant and the introduction temperature is 1230° F. (run 5a) and 1220° F. (run 5b);

(6) the treatment agent introduced is an aqueous solution which comprises 10% by weight of furfuryl amine and 0.1% by weight of a commercially available surfactant and the introduction temperature is 1525° F.;

(7) the treatment agent introduced is an aqueous solution which comprises 10% by weight of furfuryl alcohol and 0.1% by weight of a commercially available surfactant and the introduction temperature is 1350° F.;

(8) the treatment agent introduced is an aqueous solution which comprises 10% by weight of gluconic acid and 0.1% by weight of a commercially available surfactant and the introduction temperature is 1230° F.;

(9) the treatment agent introduced is an aqueous solution which comprises 10% by weight of citric acid and 0.1% by weight of a commercially available surfactant and the introduction temperature is 1230° F.;

(10) the treatment agent introduced is an aqueous solution which comprises 10% by weight of formic acid and 0.1% by weight of a commercially available surfactant and the introduction temperature is 1230° F.;

(11) the treatment agent introduced is an aqueous solution which comprises 10% by weight of n-butyl acetate and 0.1% by weight of a commercially available surfactant and the introduction temperature is 1230° F.;

(12) the treatment agent introduced is an aqueous solution which comprises 10% by weight of 1,3-butylene glycol and 0.1% by weight of a commercially available surfactant and the introduction temperature is 1245° F.;

(13) the treatment agent introduced is an aqueous solution which comprises 10% by weight of methylal and 0.1% by weight of a commercially available surfactant and the introduction temperature is 1245° F.;

(14) the treatment agent introduced is an aqueous solution which comprises 10% by weight of tetrahydrofuryl alcohol and 0.1% by weight of a commercially available surfactant and the introduction temperature is 1250° F.;

(15) the treatment agent introduced is an aqueous solution which comprises 10% by weight of fish oil and 0.1% by weight of a commercially available surfactant and the introduction temperature is 1205° F.;

(16) the treatment agent introduced is an aqueous solution which comprises 10% by weight of coumalic acid and 0.1% by weight of a commercially available surfactant and the introduction temperature is 1205° F.;

(17) the treatment agent introduced is an aqueous solution which comprises 10% by weight of furfuryl acetate and 0.1% by weight of a commercially available surfactant and the introduction temperature is 1200° F.;

(18) the treatment agent introduced is an aqueous solution which comprises 10% by weight of tetrahydrofuran 1,2,3,4-tetrahydrocarboxylic acid and 0.1% by weight of a commercially available surfactant and the introduction temperature is 1200° F.;

(19) the treatment agent introduced is an aqueous solution which comprises 10% by weight of tetrahydrofurfurylamine and 0.1% by weight of a commercially available surfactant and the introduction temperature is 1200° F.;

(20) the treatment agent introduced is an aqueous solution which comprises 10% by weight of tetrahydropyran and 0.1% by weight of a commercially available surfactant and the introduction temperature is 1200° F.;

(21) the treatment agent introduced is an aqueous solution which comprises 10% by weight of 2,5-furandimethanol and 0.1% by weight of a commercially available surfactant and the introduction temperature is 1210° F.;

(22) the treatment agent introduced is an aqueous solution which comprises 10% by weight of mannitol and 0.1% by weight of a commercially available surfactant and the introduction temperature is 1215° F.;

(23) the treatment agent introduced is an aqueous solution which comprises 10% by weight of hexamethylenediamine and 0.1% by weight of a commercially available surfactant and the introduction temperature is 1520° F. (run 23a) and 1190° F. (run 23b);

(24) the treatment agent introduced is an aqueous solution which comprises 10% by weight of acetic anhydride and 0.1% by weight of a commercially available surfactant and the introduction temperature is 1210° F.;

(25) the treatment agent introduced is an aqueous solution which comprises 10% by weight of oxalic acid and 0.1% by weight of a commercially available surfactant and the introduction temperature is 1210° F.;

(26) the treatment agent introduced is an aqueous solution which comprises 10% by weight of mucic acid and 0.1% by weight of a commercially available surfactant and the introduction temperature is 1215° F.; and

(27) the treatment agent introduced is an aqueous solution which comprises 10% by weight of d-galactose and 0.1% by weight of a commercially available surfactant and the introduction temperature is 1220° F.

TABLE 1

| Run | $O_2$ (%) | $NO_x$ Baseline | (ppm) Final | $NO_x$ red. (%) | $NH_3$ (ppm) | CO (ppm) |
|---|---|---|---|---|---|---|
| 1a | 3.0 | 195 | 184 | 5.6 | — | 260 |
| 1b | 3.0 | 197 | 182 | 7.6 | — | 220 |
| 2a | 3.0 | 195 | 186 | 4.6 | — | 140 |
| 2b | 3.0 | 197 | 175 | 11.2 | — | 220 |
| 3 | 3.0 | 157 | 103 | 34.4 | 5 | 440 |
| 4a | 3.2 | 160 | 115 | 28.1 | 20 | 600 |
| 4b | 2.9 | 164 | 132 | 19.5 | 4 | 300 |
| 5a | 3.2 | 160 | 132 | 17.5 | 12 | 720 |
| 5b | 3.0 | 166 | 143 | 13.9 | 4 | 315 |
| 6 | 3.1 | 209 | 143 | 31.6 | 6 | 22 |
| 7 | 3.0 | 209 | 188 | 10.0 | 1.6 | 250 |
| 8 | 3.2 | 163 | 136 | 16.6 | 3 | 450 |
| 9 | 3.2 | 163 | 148 | 9.2 | 3 | 290 |
| 10 | 2.8 | 174 | 167 | 4.0 | 6 | 52 |
| 11 | 3.2 | 208 | 183 | 12.0 | 7 | 420 |
| 12 | 3.2 | 208 | 179 | 13.9 | 7 | 355 |
| 13 | 3.2 | 208 | 169 | 18.8 | 11 | 370 |
| 14 | 3.0 | 208 | 185 | 11.1 | 6 | 350 |
| 15 | 3.0 | 145 | 105 | 27.6 | 10 | 454 |
| 16 | 3.0 | 147 | 130 | 11.6 | 3 | 205 |
| 17 | 3.0 | 148 | 138 | 6.8 | 2 | 57 |
| 18 | 3.0 | 148 | 126 | 14.9 | 2 | 165 |
| 19 | 3.0 | 149 | 107 | 28.2 | 10 | 290 |
| 20 | 3.1 | 164 | 130 | 20.7 | 8 | 380 |
| 21 | 3.2 | 164 | 132 | 19.5 | 4 | 395 |
| 22 | 3.0 | 164 | 135 | 17.7 | 4 | 288 |
| 23a | 3.0 | 168 | 122 | 27.4 | 10 | 22 |
| 23b | 3.1 | 185 | 142 | 23.2 | 14 | 260 |
| 24 | 3.0 | 192 | 172 | 10.4 | 2 | 117 |
| 25 | 3.0 | 192 | 186 | 3.1 | 5 | 32 |
| 26 | 2.8 | 161 | 145 | 9.9 | 2 | 155 |
| 27 | 2.7 | 161 | 125 | 22.4 | 3 | 276 |

EXAMPLE II

The process of Example I is repeated except that the burner is fired at a rate of 9.6 lbs/hr. to 10.2 lbs/hr. to achieve the desired temperature. A baseline nitrogen oxides concentration reading is taken prior to beginning each run to calculate the introduction ratio of treatment agent to baseline nitrogen oxides, and a final nitrogen oxides reading is taken during and downstream from introduction of the treatment agents to calculate the reduction in the nitrogen oxides concentration in the effluent elicited by each of the treatment agents introduced. Additionally, ammonia and carbon monoxide readings are taken during and downstream from introduction of the treatment agents to measure the production of other pollutants.

The percent excess oxygen for each treatment agent introduction, the baseline $NO_x$, final $NO_x$, % reduction of $NO_x$, ammonia level and carbon monoxide level for each run is set out in Table 2.

The following runs are made:

(1) the treatment agent introduced is an aqueous solution which comprises 10% by weight of urea, 15% by weight of $NH_4$-lignosulfonate and 0.1% by weight of a commercially available surfactant and the introduction temperature is 1530° F.;

(2) the treatment agent introduced is an aqueous solution which comprises 10% by weight of urea, 15% by weight of calcium lignosulfonate and 0.1% of a commercially available surfactant and the introduction temperature is 1525° F.;

(3) the treatment agent introduced is an aqueous solution which comprises 10% by weight of urea, 10% by weight of 1,3-dioxolane and 0.1% of a commercially available surfactant and the introduction temperature is 1550° F.;

(4) the treatment agent introduced is an aqueous solution which comprises 10% by weight of urea, 10% by weight of 1,4 dioxane and 0.1% by weight of a commercially available surfactant and the introduction temperature is 1555° F.;

(5) the treatment agent introduced is an aqueous solution which comprises 10% by weight of urea, 10% by weight of tetrahydrofuran and 0.1% by weight of a commercially available surfactant and the introduction temperature is 1550° F.;

(6) the treatment agent introduced is an aqueous solution which comprises 10% by weight of urea, 10% by weight of furfuryl alcohol and 0.1% by weight of a commercially available surfactant and the introduction temperature is 1525° F.;

(7) the treatment agent introduced is an aqueous solution which comprises 10% by weight of urea, 15% by weight of gluconic acid and 0.1% by weight of a commercially available surfactant and the introduction temperature is 1525° F.;

(8) the treatment agent introduced is an aqueous solution which comprises 10% by weight of urea, 15% by weight of citric acid and 0.1% by weight of a commercially available surfactant and the introduction temperature is 1550° F.;

(9) the treatment agent introduced is an aqueous solution which comprises 10% by weight of urea, 10% by weight of formic acid and 0.1% by weight of a commercially available surfactant and the introduction temperature is 1525° F.;

(10) the treatment agent introduced is an aqueous solution which comprises 10% by weight of urea, 10% by weight of n-butyl acetate and 0.1% by weight of a commercially available surfactant and the introduction temperature is 1495° F.;

(11) the treatment agent introduced is an aqueous solution which comprises 10% by weight of urea, 10% by weight of 1,3-butylene glycol and 0.1% by weight of a commercially available surfactant and the introduction temperature is 1495° F.;

(12) the treatment agent introduced is an aqueous solution which comprises 10% by weight of urea, 10% by weight of methylal and 0.1% by weight of a commercially available surfactant and the introduction temperature is 1490° F.;

(13) the treatment agent introduced is an aqueous solution which comprises 10% by weight of urea, 10% by weight of tetrahydrofuryl alcohol and 0.1% by weight of a commercially available surfactant and the introduction temperature is 1490° F.;

(14) the treatment agent introduced is an aqueous solution which comprises 10% by weight of urea, 10% by weight of fish oil and 0.1% by weight of a commercially available surfactant and the introduction temperature is 1500° F.;

(15) the treatment agent introduced is an aqueous solution which comprises 10% by weight of urea, 10% by weight of coumalic acid and 0.1% by weight of a commercially available surfactant and the introduction temperature is 1505° F.;

(16) the treatment agent introduced is an aqueous solution which comprises 10% by weight of urea, 10% by weight of furfuryl acetate and 0.1% by weight of a commercially available surfactant and the introduction temperature is 1515° F.;

(17) the treatment agent introduced is an aqueous solution which comprises 10% by weight of urea, 10% by weight of tetrahydrofuran 2,3,4,5-tetra-hydrocarboxylic acid and 0.1% by weight of a commercially available surfactant and the introduction temperature is 1515° F.;

(18) the treatment agent introduced is an aqueous solution which comprises 10% by weight of urea, 10% by weight of tetrahydrofurfurylamine and 0.1% by weight of a commercially available surfactant and the introduction temperature is 1515° F.;

(19) the treatment agent introduced is an aqueous solution which comprises 10% by weight of urea, 10% by weight of furylacrylic acid and 0.1% by weight of a commercially available surfactant and the introduction temperature is 1510° F.;

(20) the treatment agent introduced is an aqueous solution which comprises 10% by weight of urea, 10% by weight of tetrahydropyran and 0.1% by weight of a commercially available surfactant and the introduction temperature is 1515° F.;

(21) the treatment agent introduced is an aqueous solution which comprises 10% by weight of urea, 10% by weight of 2,5-furandimethanol and 0.1% by weight of a commercially available surfactant and the introduction temperature is 1520° F.;

(22) the treatment agent introduced is an aqueous solution which comprises 10% by weight of urea, 10% by weight of mannitol and 0.1% by weight of a commercially available surfactant and the introduction temperature is 1520° F.;

(23) the treatment agent introduced is an aqueous solution which comprises 10% by weight of urea, 10% by weight of hexamethylenediamine and 0.1% by weight of a commercially available surfactant and the introduction temperature is 1525° F.;

(24) the treatment agent introduced is an aqueous solution which comprises 10% by weight of urea, 10% by weight of acetic anhydride and 0.1% by weight of a commercially available surfactant and the introduction temperature is 1520° F.;

(25) the treatment agent introduced is an aqueous solution which comprises 10% by weight of urea, 10% by weight of oxalic acid and 0.1% by weight of a commercially available surfactant and the introduction temperature is 1510° F.;

(26) the treatment agent introduced is an aqueous solution which comprises 10% by weight of urea, 10% by weight of mucic acid and 0.1% by weight of a commercially available surfactant and the introduction temperature is 1515° F.; and

(27) the treatment agent introduced is an aqueous solution which comprises 10% by weight of urea, 10% by weight of d-galactose and 0.1% by weight of a commercially available surfactant and the introduction temperature is 1515° F.

TABLE 2

| Run | $O_2$ (%) | $NO_x$ Baseline | (ppm) Final | $NO_x$ red. (%) | $NH_3$ (ppm) | CO (ppm) |
| --- | --- | --- | --- | --- | --- | --- |
| 1 | 2.7 | 189 | 80 | 57.7 | 47 | 160 |
| 2 | 2.7 | 189 | 80 | 57.7 | 33 | 75 |
| 3 | 3.0 | 228 | 115 | 49.6 | 47 | 104 |
| 4 | 2.9 | 228 | 125 | 45.2 | 42 | 120 |
| 5 | 2.8 | 228 | 78 | 72.9 | 29 | 68 |
| 6 | 3.0 | 209 | 86 | 58.9 | 40 | 190 |
| 7 | 2.8 | 197 | 83 | 57.9 | 37 | 68 |
| 8 | 3.1 | 197 | 80 | 59.4 | 53 | 75 |
| 9 | 3.2 | 186 | 97 | 47.8 | 87 | 96 |
| 10 | 3.0 | 211 | 97 | 54.0 | 57 | 170 |
| 11 | 3.0 | 211 | 98 | 53.6 | 60 | 168 |
| 12 | 3.0 | 211 | 147 | 30.3 | 85 | 245 |
| 13 | 3.0 | 211 | 100 | 52.6 | 37 | 205 |
| 14 | 2.9 | 213 | 90 | 57.7 | 13 | 50 |
| 15 | 3.0 | 213 | 125 | 41.3 | 87 | 187 |
| 16 | 3.0 | 213 | 90 | 57.7 | 87 | 155 |
| 17 | 3.0 | 213 | 118 | 44.6 | 73 | 155 |
| 18 | 2.9 | 213 | 75 | 64.8 | 56 | 104 |
| 19 | 3.2 | 199 | 82 | 58.8 | 78 | 160 |
| 20 | 3.1 | 199 | 74 | 62.8 | 35 | 60 |
| 21 | 3.2 | 199 | 77 | 61.3 | 40 | 82 |
| 22 | 3.2 | 200 | 78 | 61.0 | 50 | 112 |
| 23 | 3.0 | 169 | 72 | 57.4 | 73 | 110 |
| 24 | 3.0 | 169 | 84 | 50.3 | 82 | 135 |
| 25 | 3.0 | 163 | 125 | 23.3 | 65 | 56 |
| 26 | 3.0 | 163 | 132 | 19.0 | 92 | 125 |
| 27 | 2.9 | 163 | 82 | 49.7 | 89 | 180 |

EXAMPLE III

The process of Example I is repeated except that the burner is fired at a rate of 10.2 lbs/hr. to achieve the desired temperature. A baseline nitrogen oxides concentration reading is taken prior to beginning each run to calculate the introduction ratio of treatment agent to baseline nitrogen oxides, and a final nitrogen oxides reading is taken during and downstream from introduction of the treatment agents to calculate the reduction in the nitrogen oxides concentration in the effluent elicited by each of the treatment agents introduced. Additionally, ammonia and carbon monoxide readings are taken during and downstream from introduction of the treatment agents to measure the production of other pollutants.

The percent excess oxygen for each treatment agent introduction, the baseline $NO_x$, final $NO_x$, % reduction of $NO_x$, ammonia level and carbon monoxide level for each run is set out in Table 3.

The following runs are made:

(1) the treatment agent introduced is an aqueous solution which comprises 6% by weight of ammonia, 10% by weight of furfuryl alcohol and 0.1% by weight of a commercially available surfactant and the introduction temperature is 1445° F.;

(2) the treatment agent introduced is an aqueous solution which comprises 6% by weight of ammonia, 10% by weight of n-butyl acetate and 0.1% of a commercially available surfactant and the introduction temperature is 1450° F.;

(3) the treatment agent introduced is an aqueous solution which comprises 6% by weight of ammonia, 10% by weight of tetrahydrofurfuryl alcohol and 0.1% of a commercially available surfactant and the introduction temperature is 1450° F.;

(4) the treatment agent introduced is an aqueous solution which comprises 6% by weight of ammonia, 10% by weight of fish oil and 0.1% by weight of a commercially available surfactant and the introduction temperature is 1450° F.;

(5) the treatment agent introduced is an aqueous solution which comprises 6% by weight of ammonia, 10% by weight of tetrahydrofurfurylamine and 0.1% by weight of a commercially available surfactant and the introduction temperature is 1450° F.; and (6) the treatment agent introduced is an aqueous solution which comprises 6% by weight of ammonia, 10% by weight of tetrahydropyran and 0.1% by weight of a commercially available surfactant and the introduction temperature is 1450° F.

TABLE 3

| Run | $O_2$ (%) | $NO_x$ Baseline | (ppm) Final | $NO_x$ red. (%) | $NH_3$ (ppm) | CO (ppm) |
| --- | --- | --- | --- | --- | --- | --- |
| 1 | 3.0 | 176 | 132 | 25.0 | 7 | 420 |
| 2 | 3.0 | 176 | 122 | 30.7 | 8 | 300 |
| 3 | 2.9 | 176 | 122 | 30.7 | 8 | 495 |
| 4 | 3.2 | 176 | 101 | 42.6 | 6 | 440 |
| 5 | 3.0 | 176 | 120 | 31.8 | 10 | 340 |
| 6 | 2.9 | 176 | 109 | 38.1 | 4 | 405 |

It is clear from the foregoing examples that the practice of this invention leads to substantial reductions in the nitrogen oxides concentration in the effluent from the combustion of a carbonaceous fuel. The compositions disclosed herein as being useful components of $NO_x$ reducing treatment agents have been shown to be effective alone, especially at lower temperatures, and as enhancers for urea or ammonia.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of the concentration of nitrogen oxides in the effluent from the combustion of a carbonaceous fuel, the process comprising introducing a treatment agent which comprises a composition selected from the group consisting of $NH_4$-lignosulfonate, calcium lignosulfonate, 2-furoic acid, 1,3 dioxolane, tetrahydrofuran, furfurylamine, furfurylalcohol, gluconic acid, citric acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galactose.

2. The process of claim 1 wherein the temperature of the effluent is no greater than about 2100° F.

3. The process of claim 2 wherein the temperature of the effluent is no greater than about 1450° F.

4. The process of claim 3 wherein the temperature of the effluent is no greater than about 1300° F.

5. The process of claim 1 wherein said treatment agent is introduced into the effluent at a weight ratio of said treatment agent to the baseline nitrogen oxides level of about 1:10 to about 10:1.

6. The process of claim 5 wherein the weight ratio of treatment agent to the baseline nitrogen oxides level is about 1:6 to about 5:1.

7. The process of claim 1 wherein said treatment agent is in solution, in a mixture or in a dispersion.

8. The process of claim 7 wherein the solvent used in said solution, mixture or dispersion comprises water.

9. The process of claim 1 wherein said treatment agent further comprises urea or ammonia.

10. The process of claim 9 wherein said urea or ammonia is present in said solution, mixture or dispersion in an amount of about 2% to about 60% by weight.

11. The process of claim 10 wherein said composition selected from the group consisting of NH$_4$-lignosulfonate, calcium lignosulfonate, 2-furoic acid, 1,3 dioxolane, tetrahydrofuran, furfurylamine, furfurylalcohol, gluconic acid, citric acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galactose is present in said solution, mixture or dispersion in an amount of about 0.5% to about 50% by weight.

12. The process of claim 1 wherein the effluent comprises an excess of oxygen.

13. The process of claim 12 wherein said effluent has an excess of oxygen of no greater than about 12% by volume.

14. The process of claim 13 wherein said excess of oxygen in the effluent is about 1% to about 6% by volume.

15. A process for the reduction of the concentration of nitrogen oxides in the oxygen-rich effluent from the combustion of a carbonaceous fuel, the process comprising introducing a treatment agent which comprises urea or ammonia and further comprises a composition selected from the group consisting of NH$_4$-lignosulfonate, calcium lignosulfonate, 2-furoic acid, 1,3 dioxolane, 1,4 dioxane, tetrahydrofuran, furfurylamine, furfurylalcohol, gluconic acid, citric acid, formic acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galatose into an effluent having a temperature between about 1300° F. and about 2100° F. under conditions effective to reduce the concentration of nitrogen oxides in the effluent.

16. The process of claim 15 wherein the effluent is at a temperature of greater than about 1450° F.

17. The process of claim 15 wherein said treatment agent is in solution, in a mixture or in a dispersion.

18. The process of claim 17 wherein the solvent used in said solution, mixture or dispersion comprises water.

19. The process of claim 18 wherein urea or ammonia is present in said solution, mixture or dispersion in an amount of about 2% to about 60% by weight.

20. The process of claim 19 wherein said composition selected from the group consisting of NH$_4$-lignosulfonate, calcium lignosulfonate, 2-furoic acid, 1,3 dioxolane, 1,4 dioxane, tetrahydrofuran, furfurylamine, furfurylalcohol, gluconic acid, citric acid, formic acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galactose is present in said solution, mixture or dispersion in an amount of about 0.5% to about 25% by weight.

21. The process of claim 15 wherein said treatment agent is introduced into the effluent at a molar ratio of said treatment agent to the baseline nitrogen oxides level of about 1:10 to about 10:1.

22. The process of claim 21 wherein the molar ratio of said treatment agent to baseline nitrogen oxides level is about 1:6 to about 5:1.

23. The process of claim 15 wherein said effluent has an excess of oxygen of no greater than about 12% by volume.

24. A process for the reduction of the concentration of nitrogen oxides in the oxygen-rich effluent from the combustion of a carbonaceous fuel, the process comprising introducing a treatment agent which comprises an aqueous solution, mixture or dispersion of about 2% to about 60% by weight of urea or ammonia and about 0.5% to about 25% by weight of a composition selected from the group consisting of NH$_4$-lignosulfonate, calcium lignosulfonate, 2-furoic acid, 1,3 dioxolane, 1,4 dioxane, tetrahydrofuran, furfurylamine, furfurylalcohol, gluconic acid, citric acid, formic acid, n-butyl acetate, 1,3 butylene glycol, methylal, tetrahydrofuryl alcohol, furan, fish oil, coumalic acid, furfuryl acetate, tetrahydrofuran 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, oxalic acid, mucic acid and d-galactose into an effluent having an excess of oxygen of about 1% to about 12% by volume and a temperature between about 1300° F. and about 2000° F. in an amount sufficient to provide a molar ratio of said treatment agent to the baseline nitrogen oxides level of about 1:6 to about 5:1, under conditions effective to reduce the nitrogen oxides level in the effluent.

* * * * *